(12) United States Patent
Xiong et al.

(10) Patent No.: US 12,522,027 B2
(45) Date of Patent: Jan. 13, 2026

(54) PUNCTURE RESISTANT MUTE EXPLOSION-PROOF CUSHION FOR TYRE AND WHEEL THEREOF

(71) Applicant: Yinyin Xiong, Shenzhen (CN)

(72) Inventors: Yinyin Xiong, Shenzhen (CN); Wei Liang, Shenzhen (CN)

(73) Assignee: Yinyin Xiong, Shenzhen (CN)

( * ) Notice: Subject to any disclaimer, the term of this patent is extended or adjusted under 35 U.S.C. 154(b) by 659 days.

(21) Appl. No.: 17/989,631

(22) Filed: Nov. 17, 2022

(65) Prior Publication Data

US 2023/0158839 A1     May 25, 2023

(30) Foreign Application Priority Data

Nov. 19, 2021   (CN) .......................... 202122854935.4

(51) Int. Cl.
| | |
|---|---|
| *B60C 19/00* | (2006.01) |
| *B60C 7/00* | (2006.01) |
| *B60C 19/12* | (2006.01) |
| *C08J 9/06* | (2006.01) |
| *C08J 9/228* | (2006.01) |
| *C08L 23/0853* | (2025.01) |

(52) U.S. Cl.
CPC ................ *B60C 19/12* (2013.01); *B60C 7/00* (2013.01); *C08J 9/065* (2013.01); *C08J 9/228* (2013.01); *C08L 23/0853* (2013.01); *C08J 2205/042* (2013.01); *C08J 2323/08* (2013.01); *C08L 2666/58* (2013.01)

(58) Field of Classification Search
CPC .. B60C 19/12; B60C 7/00; C08J 9/065; C08J 9/228; C08J 2205/042; C08J 2323/08; C08L 23/0853; C08L 2666/58
USPC ........................................................ 106/122
See application file for complete search history.

(56) References Cited

FOREIGN PATENT DOCUMENTS

| | | | | |
|---|---|---|---|---|
| CN | 214240312 U | * | 9/2021 | ............. B60C 19/00 |
| JP | 2001514962 A | * | 9/2001 | ........... B01J 37/0201 |

* cited by examiner

*Primary Examiner* — James E McDonough

(57) ABSTRACT

A puncture resistant mute explosion-proof cushion for a tyre and a wheel thereof are provided. The explosion-proof cushion is annular, received in the tyre and made of composite nano vinyl acetate copolymer. The explosion-proof cushion includes an inner ring and an outer ring wrapped on the inner ring; when the explosion-proof cushion is installed in the tyre, the outer ring is attached to a top surface and a side surface of an inner wall of the tyre, and a height from the inner ring to the outer ring along a radial direction of the explosion-proof cushion is less than a height of the side surface of the inner wall of the tyre. The explosion-proof cushion of the present disclosure can improve comfort during ordinary driving of the tyre, and simultaneously can protect an integral structure of the wheel when the tyre runs under a condition of a tyre burst.

11 Claims, 3 Drawing Sheets

PUNCTURE RESISTANT MUTE EXPLOSION-PROOF CUSHION FOR TYRE AND WHEEL THEREOF

CROSS-REFERENCE TO RELATED APPLICATION

This application claims the benefit of priority from Chinese Patent Application No. 202122854935.4 entitled "EXPLOSION-PROOF CUSHION FOR TYRE AND WHEEL THEREOF" and filed on Nov. 19, 2021, the content of which is hereby incorporated by reference in its entire by reference.

BACKGROUND

Technical Field

The present disclosure generally relates to the technical field of tyre explosion-proof, and especially relates to a puncture resistant mute explosion-proof cushion for a tyre and a wheel thereof.

Description of Related Art

Tubeless tyres that have been commonly used in conventional automobiles generally include vacuum tyres and solid tyres, etc.

Both a wall thickness and strength of the vacuum tyre are increased relative to those ordinary tyres with inner tubes, so that the automobile can still run for a certain distance after the vacuum tyre is punctured. However, when the vacuum tyre is punctured and a tyre pressure of the tyre decreases, if the automobile continuously runs, it is easy to damage a wheel rim of the automobile and wear out the tyre of the automobile, resulting in bulges of the tyre and other problems.

The solid tyre is made of a foam cushioning material, there is no gap between the wheel rim and the tyre, so that a force applied on the tyre can be directly transmitted into the wheel rim and then to a body of the automobile, which results in high rigidity of the entire wheel, poor cushioning and shock absorption effect, so that driving comfort can be greatly influenced. Therefore, the related art needs to be improved.

SUMMARY

The technical problems to be solved: in view of the shortcomings of the related art, the present disclosure provides a puncture resistant mute explosion-proof cushion for a tyre and a wheel thereof which can improve comfort of the tyre during ordinary driving, and simultaneously protect an integral structure of the wheel when the tyre runs under a condition of a tyre burst.

The technical solution adopted for solving technical problems of the present disclosure is:

a puncture resistant mute explosion-proof cushion for a tyre according to an embodiment of the present disclosure includes:

the explosion-proof cushion with an annular shape adapted to be received in the tyre and made of composite nano vinyl acetate copolymer;

the explosion-proof cushion including an inner ring and an outer ring wrapped on the inner ring, and wherein when the explosion-proof cushion is installed in the tyre, the outer ring is attached to a top surface and a side surface of an inner wall of the tyre, and a height from the inner ring to the outer ring along a radial direction of the explosion-proof cushion is less than a height of the side surface of the inner wall of the tyre.

Wherein the composite nano vinyl acetate copolymer is prepared from ethylene-vinyl acetate copolymer (EVA, and its molecular formula: $(C_2H_4)_x \cdot (C_4H_6O_2)_y$), sodium borohydride ($NaBH_4$) and sodium silicate ($Na_2SiO_3 \cdot 9H_2O$), and a mass ratio of the ethylene-vinyl acetate copolymer, the sodium borohydride and the sodium silicate is 1:0.1~0.15: 0.08~0.12; specific preparation steps of the composite nano vinyl acetate copolymer as follows: taking the ethylene-vinyl acetate copolymer as a basic material, adding the sodium borohydride in the basic material in a melting state at a temperature of 180~190° C. and stirring with a high speed for 20~30 minutes to fully mix the ethylene-vinyl acetate copolymer and the sodium borohydride; forming nano bubbles with a diameter of 100~120 nm in a middle of the ethylene-vinyl acetate copolymer and orderly displacement; adding the sodium silicate and stirring with the high speed for 10~20 minutes when the temperature drops to 150~160° C., and then pouring into a mould of the puncture resistant mute explosion-proof cushion for cooling.

Wherein an adhesive layer is arranged on a surface of the outer ring for adhering the explosion-proof cushion to the top surface and the side surface of the inner wall of the tyre.

Wherein when the explosion-proof cushion is installed in the tyre, the height from the inner ring to the outer ring along the radial direction of the explosion-proof cushion is equal to 70% to 85% of the height of the side surface of the inner wall of the tyre.

Wherein when the explosion-proof cushion is installed in the tyre, a top wall of the outer ring is attached to the top surface of the inner wall of the tyre, and an outer wall of the outer ring is attached to the side surface of the inner wall of the tyre.

A wheel according to an embodiment of the present disclosure includes a wheel rim, a tyre wrapped on the wheel rim, and a puncture resistant mute explosion-proof cushion; and wherein an outer ring is attached to a top surface and a side surface of an inner wall of the tyre, and a height from the inner ring to the outer ring along a radial direction of the explosion-proof cushion is less than a height of the side surface of the inner wall of the tyre, so that a gap is formed between the inner ring and an upper surface of the wheel rim.

Wherein the gap formed between the inner ring and the upper surface of the wheel rim is between 1~4 cm.

Wherein the gap formed between the inner ring and the upper surface of the wheel rim is between 2~3 cm.

Wherein the tyre is a vacuum tyre.

It should be understood that, within the scope of the present disclosure, above-mentioned technical features of the present disclosure and those specifically described below (in the embodiments) can be combined with each other to constitute a new or preferred technical solution, because it is to be limited to space, it is not to be described in any more detail herein.

The puncture resistant mute explosion-proof cushion of the present disclosure is manufactured into an annular shape by the compounding nano vinyl acetate copolymer, which includes the inner ring and the outer ring wrapped on the inner ring. When the explosion-proof cushion is installed in the tyre, the outer ring is attached to the top surface and the side surface of the inner wall of the tyre, and the height from the inner ring to the outer ring along the radial direction of the explosion-proof cushion is less than the height of the side surface of the inner wall of the tyre. The composite nano vinyl acetate copolymer has high resilience and tension resistance, good toughness, good shock resistance and cushioning performances, when a tread of the tyre is punctured by a sharp object during the running process, the tyre can't leak air as long as the explosion-proof cushion is not punctured, and even if the explosion-proof cushion is punctured or the sidewall of the tyre is punctured to cause air leakage, the strength and the thickness of the explosion-proof cushion can still be effectively supported, so that the wheel rim and the tyre are protected from being damaged, and the automobile can still continue to run normally. Meanwhile, the height from the inner ring to the outer ring along the radial direction of the explosion-proof cushion is less than the height of the side surface of the inner wall of the tyre, so that the gap exists between the wheel rim and the inner ring of the explosion-proof cushion, which plays a buffering role to ensure the driving comfort thereof.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
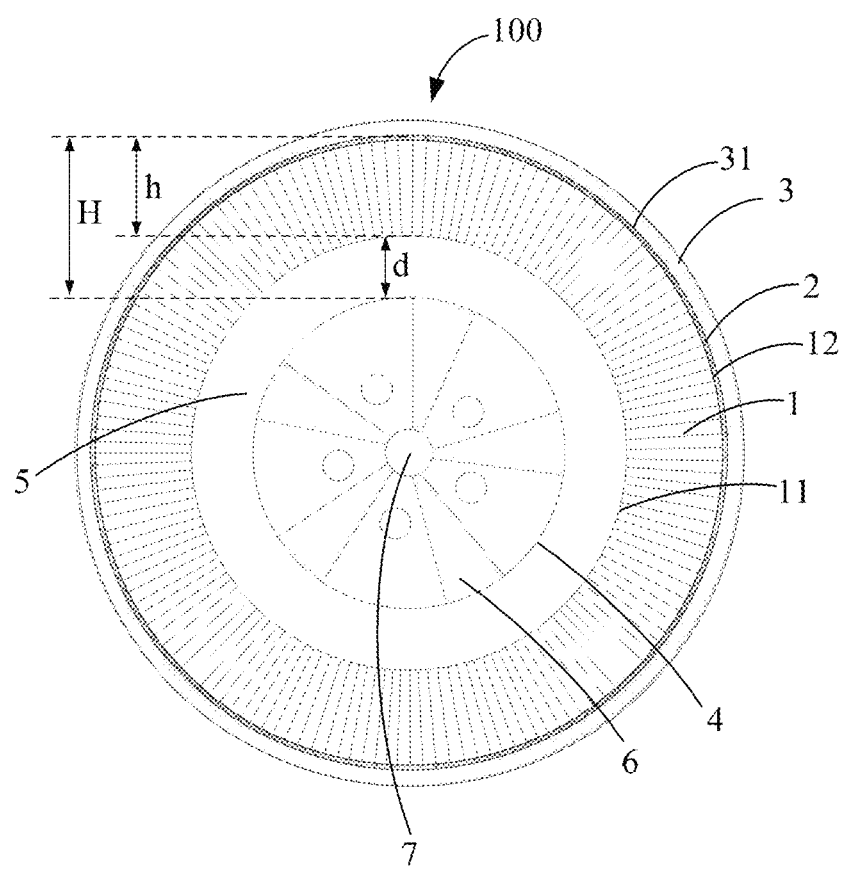
FIG. 1 is a schematic longitudinal sectional view of a puncture resistant mute explosion-proof cushion installed in a wheel in accordance with an embodiment of the present disclosure.

The element labels according to the exemplary embodiment of the present disclosure shown as below:

puncture resistant mute explosion-proof cushion 1, inner ring 11, outer ring 12, outer side wall 13, top wall 14, adhesive layer 2, tyre 3, top surface 31, side surface 32, tread 33, wheel rim 4, gap 5, spoke 6, wheel hub 7, wheel 100.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In the description of the present disclosure, it needs to be explained that all the directional indicators (such as the terms: "upper", "below", "left", "right", "front", "back" . . . ), are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In the description of the present disclosure, except where specifically otherwise illustrated or limited, the terms "connect" and "link" used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Furthermore, in the description of the present disclosure, the terms such as "first" and "second" shown in the specification are only used to describe, but not indicated that the elements of the present disclosure is important or represented the amount of the elements. That is, the features limited by the terms of "first" and "second" may explicitly or implicitly include one or more features.

Figure 2:
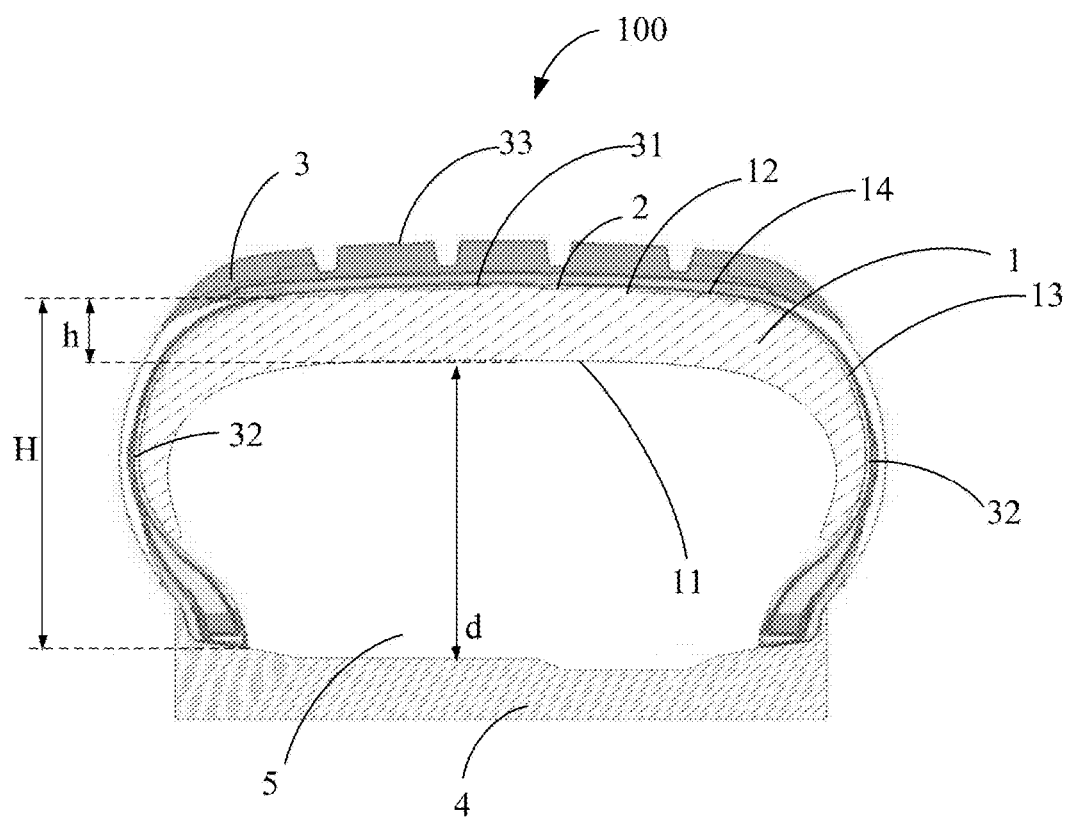
FIG. 2 is a schematic horizontal cross-sectional view of the puncture resistant mute explosion-proof cushion installed in the wheel of FIG. 1.
Figure 3:
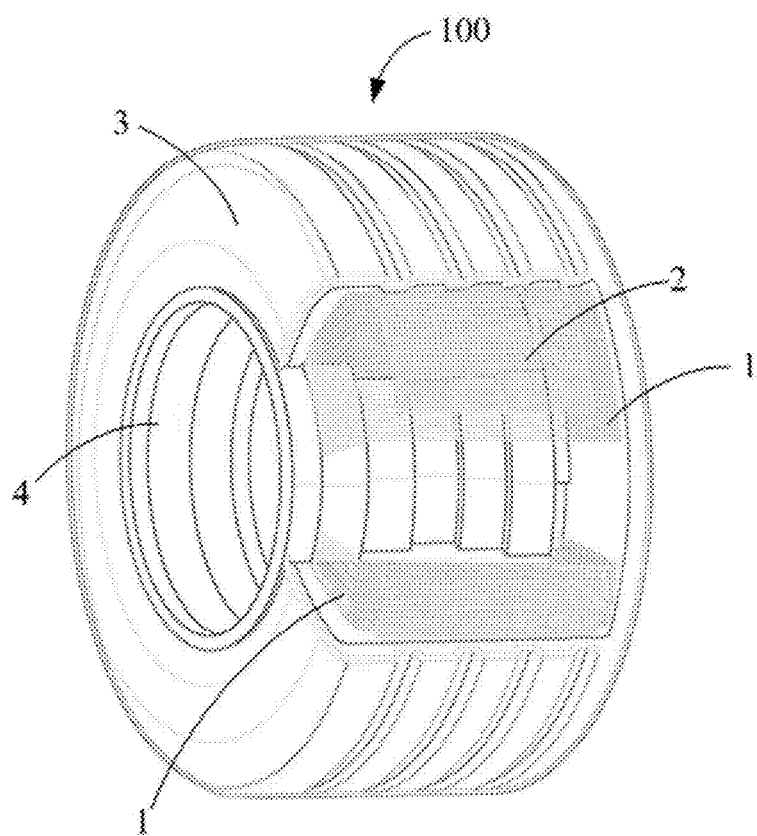
FIG. 3 is a partial cross-sectional schematic view of the wheel equipped with puncture resistant mute explosion-proof cushion of FIG. 1.

Referring to FIG. 1 to FIG. 3, a puncture resistant mute explosion-proof cushion 1 for a tyre 3 is provided that the explosion-proof cushion 1 is annular and adapted to be received in the tyre 3. That is, the shape of the explosion-proof cushion 1 of the present disclosure is a ring suitable for the tyre 3, so as to be easily installed in the tyre 3, and a shape and a size of the explosion-proof cushion 1 will change with a type and a size of the tyre 3. In an embodiment of the present disclosure, the explosion-proof cushion 1 can be a ring structure with a head and a tail being closely connected each other, or a ring structure with a head and a tail being opened each other. When installing the ring structure with the head and the tail being opened each other, first connecting the head with the tail of the explosion-proof cushion 1, and then installing the explosion-proof cushion 1 into the tyre 3.

The explosion-proof cushion 1 made of composite nano vinyl acetate copolymer which is prepared from ethylene-vinyl acetate copolymer (EVA, and its molecular formula: $(C_2H_4)_x \cdot (C_4H_6O_2)_y$), sodium borohydride ($NaBH_4$) and sodium silicate ($Na_2SiO_3 \cdot 9H_2O$), and a mass ratio of the ethylene-vinyl acetate copolymer, the sodium borohydride and the sodium silicate is 1:0.1~0.15:0.08~0.12. Specific preparation steps of the composite nano vinyl acetate copolymer are as follows: taking the ethylene-vinyl acetate copolymer as a basic material, adding the sodium borohydride in the basic material in a melting state at a temperature of 180~190° C. and stirring with a high speed for 20~30 minutes to fully mix the ethylene-vinyl acetate copolymer and the sodium borohydride; forming nano bubbles with a diameter of 100~120 nm in a middle of the ethylene-vinyl acetate copolymer and orderly displacement; adding the sodium silicate and stirring with the high speed for 10~20 minutes when the temperature drops to 150~160° C., and then pouring into a mould of the puncture resistant mute explosion-proof cushion 1 for cooling. The ethylene-vinyl acetate copolymer is the basic material of the composite nano vinyl acetate copolymer. The sodium borohydride is added to play a role of hollow foaming and the sodium silicate is added to play a role of temperature resistance, so that the composite nano vinyl acetate copolymer can be more stable, rather than deforming due to temperature and other gas corrosion.

Figure 4:
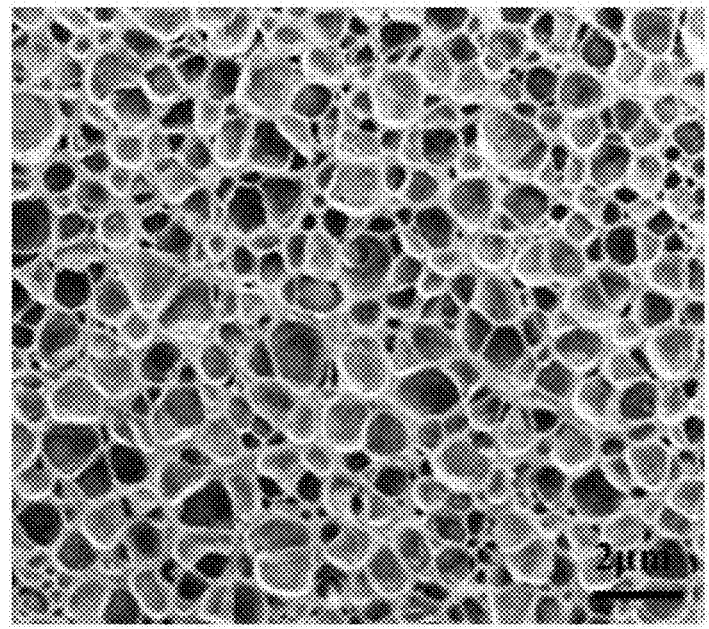
FIG. 4 is a structural characteristic schematic view of composite nano vinyl acetate copolymer under an electron microscope.

Preferably, the specific preparation steps of the composite nano vinyl acetate copolymer are as follows: taking 1 kg ethylene-vinyl acetate copolymer as the basic material, adding 0.12 kg sodium borohydride in the basic material in the melting state at a temperature of 180° C. and stirring with the high speed for 20~30 minutes to fully mix the ethylene-vinyl acetate copolymer and the sodium borohydride; forming nano bubbles with a diameter of 100~120 nm in the middle of the ethylene-vinyl acetate copolymer and orderly displacement; adding 0.09 kg sodium silicate and stirring with the high speed for 10~20 minutes when the temperature drops to 150° C., and then pouring into the mould of the puncture resistant mute explosion-proof cushion for cooling, which can obtain the puncture resistant mute explosion-proof cushion 1. Structural characteristics of the composite nano vinyl acetate copolymer are shown in FIG. 4.

The explosion-proof cushion 1 of the present disclosure includes an inner ring 11 and an outer ring 12 wrapped on the inner ring 11, when the explosion-proof cushion 1 is installed in the tyre 3, the outer ring 12 is attached to a top surface 31 and a side surface 32 of an inner wall of the tyre 3, and a height from the inner ring 11 to the outer ring 12 along a radial direction of the explosion-proof cushion 1 is less than a height of the side surface 32 of the inner wall of the tyre 3.

In an embodiment of the present disclosure, an adhesive layer 2 is arranged on a surface of the outer ring 12 for adhering the explosion-proof cushion 1 to the top surface 31 and the side surface 32 of the inner wall of the tyre 3. Referring to FIG. 1, the annular puncture resistant mute explosion-proof cushion 1 is pasted and fixed on the top surface 31 and the side surface 32 of the inner wall of the tyre 3 through the adhesive layer 2, because the composite nano vinyl acetate copolymer has high resilience, high tension resistance and good toughness, when the tyre 3 is punctured through the tread 33 by sharp objects during the running process, the tyre 3 will not leak air unless the explosion-proof cushion 1 is punctured, and even if the explosion-proof cushion 1 is punctured or the side surface 32 of the inner wall of the tyre 3 is punctured, the strength and the thickness of the explosion-proof cushion 1 can still effectively support the automobile, the wheel rim can be protected from being crushed, the tyre can be protected from being worn out and bulged, the automobile can still run for a long distance, such as 100 km, and the main structure of the wheel 100 can be protected during the running process.

Referring to FIG. 1 and FIG. 2, the height from the inner ring 11 to the outer ring 12 along the radial direction of the explosion-proof cushion 1 is h, and the height of the side surface 32 of the inner wall of the tyre 3 is H. In the present disclosure, the height h from the inner ring 11 to the outer ring 12 along the radial direction of the explosion-proof cushion 1 is less than the height H of the side surface 32 of the inner wall of the tyre 3, in this way, there is a gap 5 between the inner ring 11 of the explosion-proof cushion 1 and an upper surface of the wheel rim 4 within the wheel 100, instead of directly contacting the wheel rim 4 like the solid tyre, which can prevent the force applied on the tyre 3 from directly and rigidly transmitting to the wheel rim 4. The present disclosure buffers through the air gap between the explosion-proof cushion 1 and the wheel rim 4, thus ensuring the driving comfort thereof.

Preferably, when the explosion-proof cushion 1 is installed in the tyre 3, the height h from the inner ring 11 to the outer ring 12 along the radial direction of the explosion-proof cushion 1 is equal to 70% to 85% of the height H of the side surface 32 of the inner wall of the tyre 3. Preferably, the height h of the inner ring 11 to the outer ring 12 is equal to 80% of the height H of the side surface 32 of the inner wall of the tyre 3, which can not only play a buffering role to ensure the driving comfort thereof, but also have sufficient support strength to protect the main structure of the wheel 100 in case of a tyre burst.

Preferably, when the explosion-proof cushion 1 is installed in the tyre 3, a top wall 14 of the outer ring 12 is attached to the top surface 31 of the inner wall of the tyre 3, and an outer side wall 13 of the outer ring 12 is attached to the side surface 32 of the inner wall of the tyre 3.

That is, both the top wall 14 and the outer side wall 13 of the outer ring 12 are fitted with the inner wall of the tyre 3, so that the tyre 3 can be prevented from being punctured on both the top surface 31 and the side surface 32, so as to further enhance the explosion-proof effect thereof.

With continuing reference to FIG. 1 to FIG. 3, the wheel 100 according to an embodiment of the present disclosure includes the wheel rim 4, the tyre 3 wrapped on the wheel rim 4, and the above puncture resistant mute explosion-proof cushion 1. The outer ring 12 of the explosion-proof cushion 1 is attached to the top surface 31 and the side surface 32 of the inner wall of the tyre 3, and the height from the inner ring 11 to the outer ring 12 along the radial direction of the explosion-proof cushion 1 is less than the height of the side surface 32 of the inner wall of the tyre 3, so that the gap 5 is formed between the inner ring 11 and the upper surface of the wheel rim 4. the adhesive layer 2 is arranged on the surface of the outer ring 12 for adhering the explosion-proof cushion 1 to the top surface 31 and the side surface 32 of the inner wall of the tyre 3.

The wheel 100 of the present disclosure further includes a wheel hub 7 and a spoke 6. The wheel hub 7 is connected to the wheel rim 4 through the spoke 6. The tyre 3 of the present disclosure is a vacuum tyre.

The explosion-proof cushion 1 is installed in the wheel 100, so that it can ensure comfort during normal driving, and protect the integral structure of the wheel 100 when driving in the case of a tyre burst.

Preferably, the gap 5 formed between the inner ring 11 and the upper surface of the wheel rim 4 is between 1~4 cm. Referring to FIG. 1 and FIG. 2, the gap 5 has a distance d. The distance d is generally 1~4 cm, so that the strength of the explosion-proof cushion 1 can be ensured, and the driving comfort can be also ensured by the gap 5.

Furthermore, the gap 5 formed between the inner ring 11 and the upper surface of the wheel rim 4 is between 2~3 cm, that is, when the distance d is 2~3 cm, the effect is better.

The explosion-proof cushion 1 and the wheel 100 using the same of the present disclosure have the following advantages:

1, air leakage prevention: the composite nano vinyl acetate copolymer has good air tightness and its lightweight weight so that 12 CM weight of the composite nano vinyl acetate copolymer is 0.08 g grade light weight, which can prevent air leakage when the tread of the tyre is punctured by sharp objects and the explosion-proof cushion is not punctured. The composite nano vinyl acetate copolymer has the characteristics of high elasticity, a light weight, a high and low temperature resistance and an aging resistance, etc.

so that a large centrifugal force can't be generated when the automobile runs at a high speed.

2, continuing driving at a zero tyre pressure: the explosion-proof cushion has a thickness of 70%~85% of the height of the side wall, even under the condition of the zero tyre pressure of the tyre, the explosion-proof cushion can still support the automobile to run for 50-100 Km at a speed of 60 Km/h per hour without damaging the main structure of the tyre.

3, tyre noise reduction: the explosion-proof cushion can absorb 60% friction noise of the tyre during the high-speed process of the automobile.

4, protection of the tyre and the wheel rim: for the tyre with a low flat ratio, the explosion-proof cushion can effectively reduce bulge of the tyre and fracture of the wheel rim caused by a high-speed impact between the side wall of the wheel rim and the tread on the outer of the tyre.

5, keeping comfort of the original tyre: when the tyre pressure of the tyre is normal, the gap between the wheel rim and the explosion-proof cushion is controlled between 1~4 cm, so that the rigidity of the tyre is not increased to cause reduction of the comfort.

6, an explosion-proof performance of the composite nano vinyl acetate copolymer is better than that of an embedded steel bar explosion-proof device which is relatively expensive in the market, the composite nano vinyl acetate copolymer explosion-proof cushion has a relatively low price, and has great advantages in the degree of product market promotion and popularization, and a production technology can be automated, a production process is not complicated, and an installation is simple. The tyre can be installed in a place where ordinary repair shops can repair the tyre, has a long service life and can be repeatedly reused. The explosion-proof cushion can be used for 5-10 years in an oxygen-free environment inside the tyre and has strong resistance of high and low temperatures, which can improve automobile safety and reduce waste of social resources.

The puncture resistant mute explosion-proof cushion 1 for the tyre 3 and the wheel 100 of the present disclosure are provided, the explosion-proof cushion 1 is manufactured into the annular shape by the compounding nano vinyl acetate copolymer, which includes the inner ring 11 and the outer ring 12 wrapped on the inner ring 11. When the explosion-proof cushion 1 is installed in the tyre 3, the outer ring 12 is attached to the top surface 31 and the side surface of of the inner wall of the tyre 3, and the height from the inner ring 11 to the outer ring 12 along the radial direction of the explosion-proof cushion 1 is less than the height of the side surface 32 of the inner wall of the tyre 3. Due to characteristics of the compounding nano vinyl acetate copolymer, when the tread 33 of the tyre 3 is punctured by the sharp object during the running process, the tyre 3 can't leak air as long as the explosion-proof cushion 1 is not punctured, and even if the explosion-proof cushion 1 is punctured or the sidewall of the tyre 3 is punctured to cause air leakage, the strength and the thickness of the explosion-proof cushion 1 can still be effectively supported, so that the wheel rim 4 and the tyre 3 are protected from being damaged, and the automobile can still continue to run normally. Meanwhile, the gap exists between the wheel rim 4 and the explosion-proof cushion 1, which plays a buffering role to ensure the driving comfort thereof.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A puncture resistant mute explosion-proof cushion for a tyre with an annular shape adapted to be received in the tyre, the explosion-proof cushion made of composite nano vinyl acetate copolymer and comprising:
    an inner ring and an outer ring wrapped on the inner ring; and wherein
    when the explosion-proof cushion is installed in the tyre, the outer ring is attached to a top surface and a side surface of an inner wall of the tyre, and a height from the inner ring to the outer ring along a radial direction of the explosion-proof cushion is less than a height of the side surface of the inner wall of the tyre.

2. The explosion-proof cushion as claimed in claim 1, wherein the composite nano vinyl acetate copolymer is prepared from ethylene-vinyl acetate copolymer (EVA), sodium borohydride and sodium silicate, and a mass ratio of the ethylene-vinyl acetate copolymer, the sodium borohydride and the sodium silicate is 1:0.1~0.15:0.08~0.12.

3. The explosion-proof cushion as claimed in claim 2, wherein the mass ratio of the ethylene-vinyl acetate copolymer, the sodium borohydride and the sodium silicate is 1:0.12:0.09.

4. The explosion-proof cushion as claimed in claim 3, wherein a specific preparation process of the composite nano vinyl acetate copolymer is as follows: taking the ethylene-vinyl acetate copolymer as a basic material, adding the sodium borohydride in the basic material in a melting state at a temperature of 180~190° C. and stirring for 20~30 minutes to fully mix the ethylene-vinyl acetate copolymer and the sodium borohydride; forming nano bubbles with a diameter of 100~120 nm in a middle of the ethylene-vinyl acetate copolymer and orderly displacement; adding the sodium silicate and stirring for 10~20 minutes when the temperature drops to 150~160° C., and then pouring into a mould of the puncture resistant mute explosion-proof cushion for cooling.

5. The explosion-proof cushion as claimed in claim 1, wherein an adhesive layer is arranged on a surface of the outer ring for adhering the explosion-proof cushion to the top surface and the side surface of the inner wall of the tyre.

6. The explosion-proof cushion as claimed in claim 1, wherein when the explosion-proof cushion is installed in the tyre, the height from the inner ring to the outer ring along the radial direction of the explosion-proof cushion is equal to 70% to 85% of the height of the side surface of the inner wall of the tyre.

7. The explosion-proof cushion as claimed in claim 1, wherein when the explosion-proof cushion is installed in the tyre, a top wall of the outer ring is attached to the top surface of the inner wall of the tyre, and an outer wall of the outer ring is attached to the side surface of the inner wall of the tyre.

8. A wheel comprising a wheel rim, a tyre wrapped on the wheel rim, and a puncture resistant mute explosion-proof cushion, and a gap formed between the inner ring and an upper surface of the wheel rim; the explosion-proof cushion with an annular shape adapted to be received in the tyre, the explosion-proof cushion made of composite nano vinyl acetate copolymer and comprising:
    an inner ring and an outer ring wrapped on the inner ring; and wherein when the explosion-proof cushion is installed in the tyre, the outer ring is attached to a top surface and a side surface of an inner wall of the tyre, and a height from the inner ring to the outer ring along a radial direction of the explosion-proof cushion is less than a height of the side surface of the inner wall of the tyre.

9. The wheel as claimed in claim 8, wherein the gap formed between the inner ring and the upper surface of the wheel rim is between 1~4 cm.

10. The wheel as claimed in claim 9, wherein the gap formed between the inner ring and the upper surface of the wheel rim is between 2~3 cm.

11. The wheel as claimed in claim 8, wherein the tyre is a vacuum tyre.

\* \* \* \* \*